United States Patent

McIntosh

[15] 3,643,913
[45] Feb. 22, 1972

[54] MODULATING VALVE

[72] Inventor: Harold A. McIntosh, South Pasadena, Calif.

[73] Assignee: Robertshaw Controls Company, Richmond, Va.

[22] Filed: Aug. 28, 1969

[21] Appl. No.: 853,728

[52] U.S. Cl. .................................251/11, 236/68, 236/80
[51] Int. Cl. ............................................................F03g 7/06
[58] Field of Search ...................251/38, 45, 11; 236/80, 68

[56] References Cited

UNITED STATES PATENTS

| | | | |
|---|---|---|---|
| 1,059,197 | 4/1913 | Mustee | 236/80 |
| 2,211,301 | 8/1940 | Taylor | 236/80 X |
| 2,286,296 | 6/1942 | McGrath | 236/80 |
| 2,685,412 | 8/1954 | Schell | 236/80 X |
| 3,337,130 | 8/1967 | Erickson | 236/80 X |

*Primary Examiner*—Arnold Rosenthal
*Attorney*—Fulwider, Patton, Rieber, Lee & Utecht

[57] ABSTRACT

A modulating valve for controlling fluid flow in response to variance in a parameter and comprising a valve body having a flow port and a control chamber. One wall of the control chamber includes diaphragm which carries a poppet valve for seating over the flow port in response to pressure in the control chamber. A bleed passage communicates upstream pressure to the control chamber, and an exhaust passage relieves pressure from the control chamber. A plug is provided to selectively block flow through the exhaust passage, thereby to maintain the control chamber pressurized and to seat the poppet valve on the flow port. Positioning of the plug is controlled by an electrical control means which includes a thermally responsive element coupled with said plug and responsive to a parameter for adjusting the position of such plug to vary the pressure in said control chamber to control the positioning of said poppet. The thermally responsive element may be in the form of a thermostatic blade which has one end coupled with the plug and its opposite end constrained by the valve body to form an arcuate configuration. Such blade may then be heated by a heat motor having current therethrough controlled by a variable resistor including adjacent lengths disposed in heat exchange relationship with one another whereby expansion or contraction of the resistor, by means responsive to variations in said parameter, will vary the spacing and therefore the rate of mutual heat exchange between such lengths.

7 Claims, 4 Drawing Figures

PATENTED FEB 22 1972
3,643,913
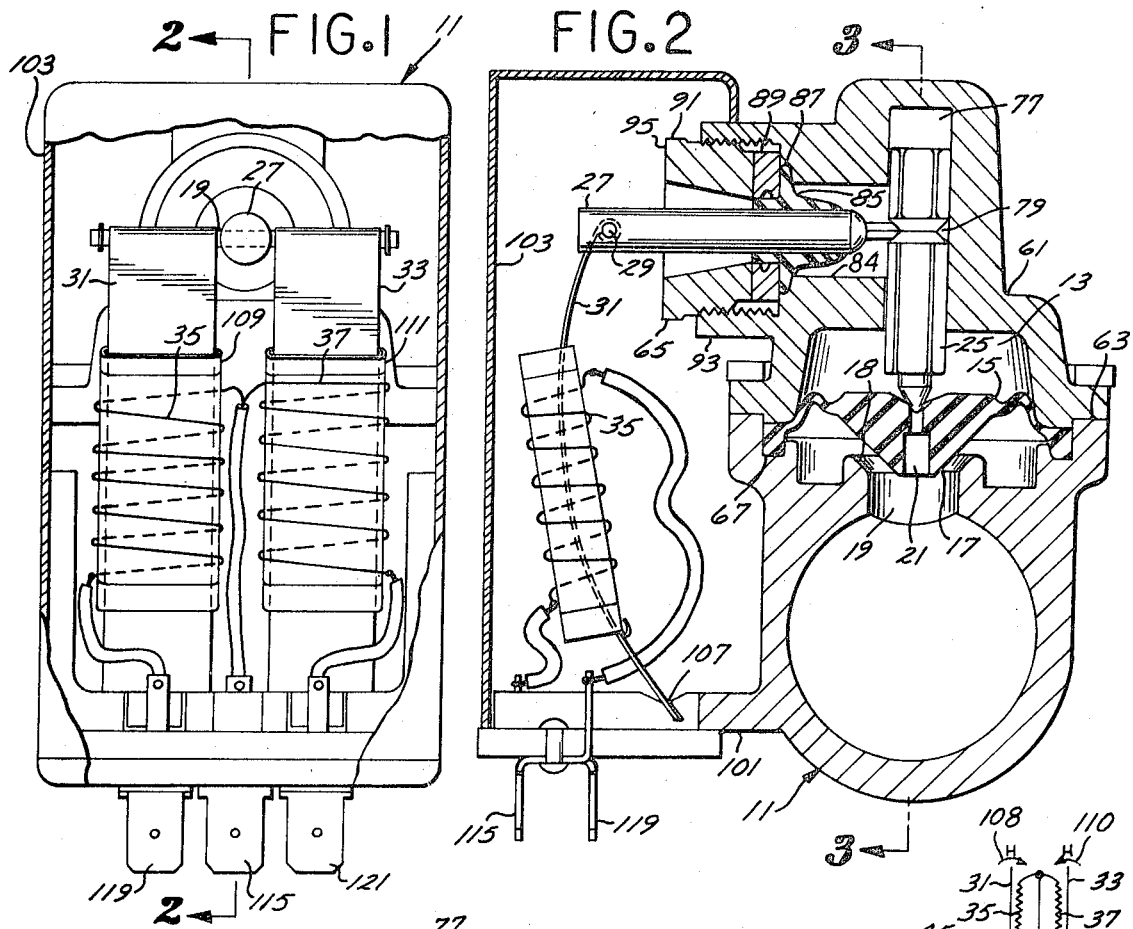
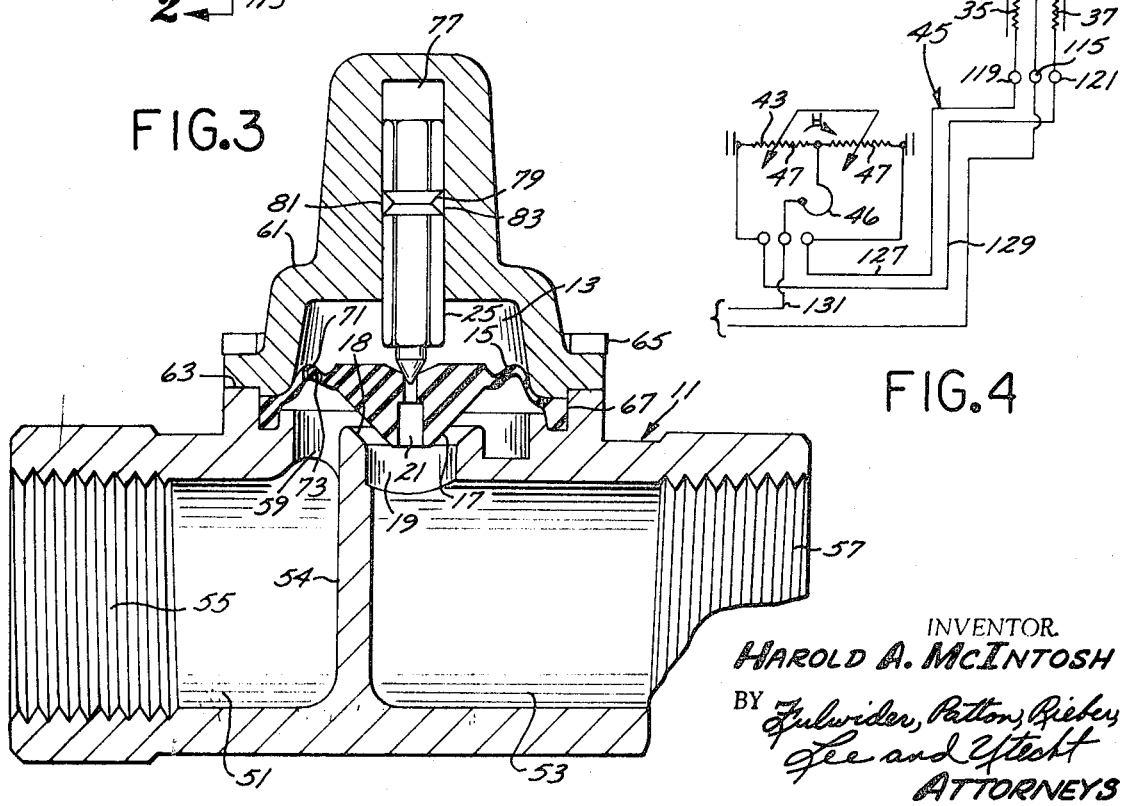
INVENTOR.
HAROLD A. McINTOSH
BY Fulwider, Patton, Rieber, Lee and Utecht
ATTORNEYS

MODULATING VALVE

BACKGROUND OF THE INVENTION

1. Field of the Invention

The present invention relates to modulating valves which control flow in response to variance in a selected parameter.

2. Description of the Prior Art

Applicant is not aware of any modulating valves whose control is initiated by variations in current flow through a variable resistor, and wherein such variations are a result of mechanical movements of portions of the resistor in response to changes in a particular parameter.

SUMMARY OF THE INVENTION

The present invention comprises a modulating valve including a control chamber having one wall in the form of a pressure responsive member which carries a valve poppet that cooperates with the valve seat to control flow through the valve. A thermally responsive element is coupled with the plug and is heated by a heat motor having current therethrough controlled by a variable resistor including adjacent lengths disposed in heat exchange relationship with one another. An actuator which is responsive to variations in a predetermined parameter mechanically adjusts the distance between the adjacent lengths of the variable resistor to thereby alter the heat exchange rate between such lengths. This controls the self-heating of the variable resistor and thereby controls the current through the variable resistor and consequently controls the current through the heating resistor.

An object of the present invention is to provide a valve which opens in proportion to the magnitude of variation of a parameter from a predetermined valve.

Another object of the present invention is to provide a modulating valve of the type described wherein the thermally responsive element is in the form of a thermostatic blade having one end coupled therewith and its opposite end constrained to cause such blade to define an arcuate bow.

Other objects and the advantages of the present invention will become apparent from a consideration of the following detailed description when taken in conjunction with the accompanying drawing.

DESCRIPTION OF THE DRAWINGS

FIG. 1 is a partially broken away front elevational view of a modulating valve embodying the present invention;

FIG. 2 is a vertical sectional view taken along the line 2—2 of FIG. 1;

FIG. 3 is a vertical sectional view taken along the line 3—3 of FIG. 2; and

FIG. 4 is an electrical schematic of an electrical circuit which may be utilized with the valve shown in FIG. 1.

DESCRIPTION OF THE PREFERRED EMBODIMENT

Referring to the drawing and particularly to FIG. 3, the modulating valve of the present invention includes a valve body 11 having a control chamber 13 whose bottom wall is defined by a pressure responsive diaphragm 15. The center of the diaphragm 15 is frustoconical in shape to define a poppet valve or poppet 17 for seating on a seat 18 formed by flow port 19. The poppet 17 includes a vertical passage 21 for exhausting pressure from the chamber 13, and a vertically reciprocable plunger 25 is provided for selectively controlling flow from the exhaust port 21.

The plunger 25 is coupled with a lever arm 27, FIG. 2, which includes a projecting end which mounts a cross pin 29. A pair of arcuate, resilient thermostatic blades 31 and 33 are connected to opposite ends of the cross pin 29, and a pair of heating resistors 35 and 37, respectively, are wrapped thereon.

Referring to FIG. 4, the heating resistors 35 and 37 are located in opposite legs of an electrical bridge, generally designated 41, which also includes a pair of variable resistors 43 and 45 in opposite legs thereof. The variable resistors 43 and 45 include adjacent, generally transversely formed sections or lengths 47 which are close enough so as to be in heat exchange relationship with one another. Accordingly, upon mechanical collapse or expansion of the resistors 43 and 45, the proximity and therefore the rate of heat exchange between such adjacent lengths 47 will be varied, causing a resultant temperature change in the material of the resistors. This in turn changes the electrical resistance of the resistor material and, all other conditions being equal, will result in a change in the current flow therethrough and to the respective resistors 35 and 37.

The expansion and collapse, that is, the mechanical movement of the adjacent lengths 47 of the resistors 43 and 45 is accomplished by a thermostatic sensing blade 46 which is responsive to temperature changes. As the resistance in the resistors 43 and 45 is changed, the current in the resistors 35 and 37 changes, and this in turn causes the resistors 35 and 37 to give off more or less heat. The heat given off by the resistors 35 and 37 heats the blades 31 and 33 and moves the projecting end of the lever arm 27 (FIG. 2) accordingly. This shifts the plunger 25 vertically to alter the flow rate through the exhaust passage 21, thereby changing the pressure in the control chamber 13 and consequently operating the diaphragm 15 to adjust the position of the valve poppet 17 relative to the seat 18.

In addition to the control chamber 13, the valve body 11 also includes the inlet chamber 51 and an outlet chamber 53. The inner ends of the chambers 51 and 53 terminate in a vertical partition 54. The outer ends are open and are provided with usual female threads 55 and 57, respectively, for connection of the valve body 11 to other system components.

The inlet chamber 51 includes an upwardly opening outlet port 59 in fluid communication with the underside of the diaphragm 15. The location of the port 59 is such that fluid from the chamber 51 passes to the flow port 19 when the poppet 17 is unseated and is blocked therefrom when the poppet 17 is seated.

The control chamber 13 is formed by a domelike element or valve bonnet 61 which includes a flange on its base which seats upon a complemental circular flange 63 forming a part of the valve body 15. The flanges are secured together by mounting bolts 65. The periphery of the diaphragm 15 includes a sealing flange 67 which is received within a circular groove formed interiorly of the mounting flange 63. The flange 67 is pressed downwardly into the circular groove in fluidtight relation by the underside of an annular shoulder forming a part of the base of the bonnet 61.

Fluid flow from the inlet chamber 51 is admitted to the control chamber 13 by means of the passage 59 and a pair of inlet passages 71 and 73 formed in the diaphragm 15. The combined flow area of the inlet passages 71 and 73 is less than the flow area of the exhaust passage 21 whereby when the plunger 25 is raised, fluid in the control chamber 13 can exhaust more rapidly than it is introduced. This causes the poppet 17 to raise off its seat 18 under the pressure of the fluid in the inlet chamber 51.

With continued reference to FIG. 3, the plunger 25 is slidably carried in a downwardly opening vertical bore 77 formed in the bonnet 61. Intermediate its ends, the plunger 25 includes a peripheral groove 79 which receives the tines 81 and 83 of a fork integral with the inner extremity of the lever arm 27 (FIG. 2).

The valve bonnet is formed with an opening 84 projecting transversely from the vertical bore 77 for receipt of a resilient insert 85 made of rubber or the like which has an axial bore therein for receipt of the lever arm 27. The insert 85 includes a radially outwardly projecting flange 87 which is sandwiched behind a washer 89. A hollow plug 91 includes exterior threads engaged upon the female threads of a boss 93 which forms part of the bonnet 61. The plug 91 has a hex-shaped head 95 by which it may be wrench tightened to secure the lever-mounting insert 85 firmly in place.

Referring to FIG. 2, the lower portion of the valve body 11 is formed with a horizontally projecting flange 101 which cooperates with a metal case 103 to form a compartment for housing the lever 27 and the thermostat blades 31 and 33. The upper ends of the thermostatic blades 31 and 33 are connected to opposite ends of the cross pin 29, and the lower ends of such blades are received in respective notches 107 formed in the flange 101. The blades 31 and 33 are arranged in opposed relationship whereby heating of the blade 31 tends to straighten it, as depicted by the arrow 108 in FIG. 4. Heating of the blade 33 tends to increase its curvature, as depicted by the arrow 110.

Electrical insulators 109 and 111 surround the respective blades 31 and 33 and the heating resistors or heat motors 35 and 37 are wound thereon. A common terminal 115, FIG. 1, is mounted centrally on the flange 101, and a pair of wires 117 extend from the terminal 115 for connection to the heat motors 35 and 37. The opposite ends of the motors 35 and 37 are connected with a pair of terminals 119 and 121, respectively, which are mounted on the flange 101 adjacent the terminal 115.

Referring to FIG. 4, the terminals 119 and 121 of the respective heat motors 35 and 37 are connected with the opposite ends of the respective variable resistors 43 and 45 by means of leads 127 and 129. As noted above, the adjacent ends of the variable resistors 43 and 45 are connected together and are coupled with a thermostatic blade 46, which is connected with a power source by means of a lead 131.

The present modulating valve is suited for use in a great variety of applications where it is important to control a fluid flow in response to changes in some parameter. In a typical operation of the subject modulating valve, such as in a hydraulic heating system to control the flow rate of chilled or heated water to an air conditioner or heater, the valve operates to control the flow of hot fluid to a heater for maintaining an environment at a selected temperature.

More particularly, the multilaminar metallic sensing blade 46 is disposed in the environment to be controlled, and the leads 131 and 117 are connected with a power source to energize the bridge 41. As long as the environmental temperature remains above the desired or set temperature, the upper extremity of the sensing blade 46 remains flexed in the direction of the arrow 135 (FIG. 4). This contracts the variable resistor 43, which reduces current flow to the motor 37, and expands the resistor 45, which increases current flow to the heat motor 35.

Heating of the motor 35 and cooling of the motor 37 heats the blade 31 and cools the blade 33, respectively. This tends to straighten both blades, thereby raising the projecting extremity of the arm 27 and lowering the plug 25 to close the bleed passage 21. Closing of the bleed passage 21 while flow continues through the inlet passages 71 and 73 causes pressure to build up in the control chamber 13 to flex the diaphragm 15 downwardly. This seats the poppet 17 on the seat 18.

When the sensing blade 46 cools, its upper extremity moves to the right, collapsing the variable resistor 45 and stretching the variable resistor 43. This disposes the lengths 47 in the resistor 45 closer together, thus increasing the heat exchange rate therebetween and decreasing the current flow therethrough. Simultaneously, the lengths 47 in the resistor 43 will be spaced farther apart, decreasing the mutual heat exchange and thereby reducing the resistance in the resistor 43 to increase current flow therethrough.

Decreasing current flow through the resistor 45 decreases current flow through the heat motor 35, cooling the blade 31, while increasing current flow through the resistor 43 increases current flow through the heat motor 37, heating the blade 33. Such cooling of the blade 31 and heating of the blade 33 increases the curvatures of such blades and raises the operator plunger 25, thereby allowing a greater quantity of fluid to escape from the control chamber 13. This reduces the pressure in the chamber 13 and causes the diaphragm 15 to raise and move the poppet 17 off its seat 18, thereby permitting flow through the flow port 19.

It is of particular importance that the distance the poppet 17 is raised off its seat 18 is proportionate to the amount of flexing of the sensing blade 46. As a consequence, heating fluid is admitted at a rate proportionate to the temperature of the environment.

The heater to which the heating fluid is supplied will gradually heat the environment, thus gradually heating the sensing blade 46 which is disposed in the environment. The heating of the blade 46 causes its upper extremity to move to the left, thus stretching the resistor 45 and collapsing the resistor 43. This increases current flow through the heat motor 35 and decreases current flow through the heat motor 37, causing blades 31 and 33 to gradually straighten and progressively restrict flow through the passage 21. The pressure in the chamber 13 then builds up in proportion to the increasing environmental temperature to gradually reduce flow through the valve until the desired or set temperature is reached.

From the foregoing, it will be apparent that the valve of the present invention provides an economical and convenient means for proportioning fluid flow in response to a particular parameter or condition, and eliminates any necessity for incorporation of a solenoid or motor to drive the valve in response to such parameter.

Various modifications and changes may be made with regard to the foregoing detailed description without departing from the spirit of the invention.

I claim:

1. A modulating valve for controlling fluid flow in response to variance in a parameter, said valve comprising:
   a valve body having a flow port and a control chamber, one wall of said control chamber including a pressure responsive member, said valve body further having a bleed passage leading from the upstream side of said port to said chamber for applying pressurizing fluid to said control chamber and an exhaust passage for exhausting fluid under pressure from said control chamber, said valve body further including a poppet carried by said pressure responsive member for selectively restricting flow through said port in response to pressure fluctuations in said control chamber;
   a plug carried from said body for movement relative to said exhaust passage to selectively restrict fluid flow therethrough;
   a first thermostatic blade coupled on one end with said plug and engaged on its opposite end with said valve body to constrain said blade in a nonlinear configuration; and
   electrical control means including a first heating resistor disposed adjacent said first thermostatic blade and a first variable resistor having flexible adjacent lengths disposed in heat exchange relationship with one another, said first variable resistor being characterized in that changes in the distances between said adjacent lengths during mechanical flexing thereof alters the heat exchange rate between such lengths sufficiently to alter the amount of current flow therethrough and correspondingly alter the current flow rate to said heating resistor to alter the heat exchange rate between said heating resistor and said blade to alter the configuration of said blade and shift said plug relative to said exhaust port, and an actuator responsive to said variance in said parameter to flex said variable resistor and thereby alter the current flow to said first heating resistor.

2. A modulating valve as set forth in claim 1 wherein:
   said valve body is formed with a passage for telescopical receipt of said plug and an opening projecting transversely from said passage; and
   a lever arm carried pivotally in said opening and coupled on one end with said plug and on its opposite end with said thermostatic blade.

3. A modulating valve as set forth in claim 1 wherein:
   said poppet is formed with said exhaust passage whereby said exhaust passage will be shifted relative to said plug as said poppet fluctuates to thereby seek a point of equilibrium.

4. A modulating valve as set forth in claim 1 that includes:

a second thermostatic blade coupled with said plug and arranged in opposed relationship to said first thermostatic blade and wherein:

said electrical control means includes a divided circuit formed with first and second heating resistors disposed in heat exchange relationship with said first and second thermostatic blades; and actuator means responsive to variances in said parameter to control the respective rates of said first and second heating resistors to alter such current rates in inverse proportions to one another.

5. A modulating valve as set forth in claim 1 wherein:

said electrical control means comprises a bridge which includes a second variable resistor having flexible adjacent lengths disposed in heat exchange relationship with one another, said second variable resistor being characterized in that changes in the distances between said adjacent lengths during mechanical flexing thereof alters the heat exchange rate between such lengths sufficiently to correspondingly alter the amount of current flow therethrough; and said actuator is coupled to adjacent ends of said first and second variable resistors whereby collapsing of said first variable resistor by said actuator also causes said second variable resistor to expand.

6. A modulating valve for controlling fluid flow in response to variance in a parameter, said valve comprising:

a valve body having a flow port and a control chamber, one wall of said control chamber including a pressure responsive member, said valve body further having a bleed passage for applying pressurizing fluid to said control chamber and an exhaust passage for exhausting fluid under pressure from said control chamber, said valve body further including a poppet carried by said pressure responsive member for selectively restricting flow through said port in response to a predetermined pressure in said control chamber;

a plug carried from said body for movement relative to said exhaust passage to selectively restrict fluid flow therethrough;

first and second thermally responsive elements coupled with said plug and arranged in opposed relationship to one another;

electrical control means including a divided circuit formed with first and second heating resistors disposed in heat exchange relationship with said respective first and second thermally responsive control elements; and actuator means responsive to variances in said parameter to control the current flow in inverse proportions through said first and second heating resistors.

7. A modulating valve as set forth in claim 6 wherein:

said resistors include flexible adjacent lengths disposed in heat exchange relationship with one another and characterized in that changes in the distances between said adjacent lengths during mechanical flexing thereof alters the heat exchange rate between such lengths sufficiently to correspondingly alter the amount of current flow therethrough; and said actuator includes means responsive to said variance in said parameter to flex said variable resistors and thereby alter the current flow to said heating resistors.

* * * * *